even further extended range of water hardness. This is a decided advantage since commercial gels must be compatible with the various degrees of water hardness encountered throughout the United States and elsewhere in the world if the gels are to be satisfactory from a consumer standpoint. As set forth previously, it was found that the presence of sodium hexametaphosphate as the sole sequestering agent in the gel formulation gave a gel having a disagreeable bitter tartness. Surprisingly, the co-presence of sodium tripolyphosphate with sodium hexametaphosphate results in a gel which does not have the disagreeable tartness produced by sodium hexametaphosphate alone.

United States Patent Office 3,455,701
Patented July 15, 1969

3,455,701
ALGIN GEL COMPOSITIONS AND METHOD
Aaron Miller, La Jolla, and James K. Rocks, San Diego, Calif., assignors to Kelco Company, San Diego, Calif., a corporation of Delaware
No Drawing. Continuation-in-part of application Ser. No. 244,270, Dec. 13, 1962. This application Apr. 4, 1966, Ser. No. 539,732
Int. Cl. A23l 1/04
U.S. Cl. 99—131      10 Claims

ABSTRACT OF THE DISCLOSURE

Production of an improved aqueous gel by gelatinizing an aqueous liquid of a water soluble alginate, calcium carbonate, sodium tripolyphosphate, adipic acid in an amount sufficient to liberate calcium ions from the calcium carbonate and a magnesium salt in an amount sufficient to produce a clarified gel.

---

This application is continuation-in-part of our prior copending application Ser. No. 244,270, filed Dec. 13, 1962 now abandoned.

This invention relates to aqueous gelatinous products produced from water soluble alginates by the interaction of said alginates with calcium carbonate and in the presence of sodium tripolyphosphate and adipic acid.

Prior art alginate gel compositions containing citric acid, a water soluble alginate salt, a calcium salt, and sodium hexametaphosphate were marketed in the form of a dry mix. The dry mix product was not entirely satisfactory because of package instability. For some reason, which is not understood, the citric acid apparently reacted with the calcium salt in the dry mix. As a result, when the package was added to water, it would not consistently form a gel.

In an effort to overcome the problems of the prior citric acid-alginate gels, an attempt was made to use fumaric acid in lieu of citric acid. This approach was not successful because the fumaric acid-containing gels were found to be too grainy when hard water was used in their preparation. Moreover, the mesh size of the fumaric acid was not uniform and this created problems in obtaining a homogeneous product.

In an effort to solve the problems created by use of fumaric acid in the alginate gels, an attempt was made to use adipic acid in lieu of fumaric acid. Adipic acid was found to be satisfactory in some respects but created still further problems. It was found that alginate gels containing adipic acid and a calcium phosphate salt gave a gel having a somewhat cloudy appearance. In an attempt to overcome this problem, it was found that the use of calcium carbonate as the calcium source gave a gel having the improved clarity required in a dessert gelatin.

The use of adipic acid in an alginate gel created a further problem in providing a gel which had a disagreeable tartness. Although a certain degree of tartness is a desirable characteristic of a dessert gel, the tartness of the adipic acid gels was found to be on the bitter side such that it was disagreeable to the taste. In order to over come this problem, it was found that the use of sodium tripolyphosphate as a sequestering agent in lieu of the sodium hexametaphosphate previously employed reduced the tartness of the gel such that it was greatly improved in taste.

By way of the above outlined experimentation, which proceeded on a step-by-step basis from the citric acid-alginate gels previously employed, a satisfactory gel was finally obtained. Due to the complexity of the gel system, in which all of the various ingredients play an important role, the development of the gel of the present invention was essentially a trial and error proposition. As one problem was solved by changing a particular ingredient in the gel, another problem was created which in turn had to be solved and so on. The resulting gel mix containing a water soluble alginate, calcium carbonate, sodium tripolyphosphate, and adipic acid resolved the various problems of the prior art by providing a package stable gel mix, a homogenous gel which did not have a grainy consistency, a gel having the desired clarity required of a dessert gel, and a gel whose taste was not disagreeably tart. In addition to these advantages, it was also found that the gel of the invention could be formed in water having a wide range of hardness and dissolved mineral content as encountered in various parts of the United States.

It is an object of this invention to provide new aqueous algin gel compositions and methods of producing said compositions.

The invention is suitable for use either in the hot or cold way for producing a wide variety of edible products such as fruit jams and jellies, jellied salads and broths, water jelly desserts and candy jellies.

The instant invention is particularly suitable for producing aqueous gels without refrigeration.

It is a further object of this invention to produce clear, smooth, firm yet tender gels.

It is still another object of this invention to produce one step, instant-type gels.

It is another object of this invention to produce tender aqueous gels embodying a reduced amount of a water soluble alginate It is still another object of the invention to produce gel forming compositions that are essentially non-hygroscopic and suitable for packaging in small household size packages.

It is a still further object of the invention to produce gels that are essentially stable on storage in household refrigerators.

Algin gel compositions of the type to which the improvements herein are directed are disclosed in the Gibsen U.S. Patent No. 2,918,275, issued Dec. 22, 1959.

In general, our method comprises adding a water soluble alginate, calcium carbonate, sodium tripolyphosphate, and adipic acid to an aqueous medium to produce a gel composition. The gel may be formed in cold water but preferably is formed in hot water. In a preferred embodiment of our invention we also add a magnesium salt to improve even further the clarity of the resulting gel.

Another preferred embodiment of our invention involves the use of sodium tripolyphosphate in combination with specified quantities of sodium hexametaphosphate. Surprisingly, it has been found that this combination of ingredients, coupled with the other ingredients set forth above, gives a gel which can be formed in water having an The various ingredients and the method in which they are employed in forming our gel is set forth more particularly hereinafter:

(1) A water-soluble algin. This may be the alginate of ammonium, magnesium, potassium, sodium or other alkali metal. These soluble algins may be prepared by well known methods such as disclosed in the following United States patents: 1,814,981, Thornley and Walsh, July 14, 1931; 2,036,922, Clark and Green, Apr. 7, 1936; 2,036,934, Green, Apr. 7, 1936; and 2,128,551, Le Gloahec, Aug. 30, 1938.

The viscosity of the algin is not critical, though the higher viscosity algins form stronger gels than those of lower viscosity. As the compositions are usually prepared in the dry form, the algin is comminuted. The most favorable grain size depends on the usage of the composition. An especially preferred water soluble alginate for our purpose is a commercial grade of fibrous sodium alginate sold by the Kelco Company, San Diego, Calif. The best gels for clarity and smoothness are obtained if the calcium ash of the sodium alginate is low, i.e., aboue 0.5% or less expressed as calcium oxide ash.

(2) Calcium carbonate. The calcium carbonate should preferably be a highly purified precipitated powder.

(3) Sodium tripolyphosphate. This material should likewise be in powdered form and such material is available commercially. In most cases it will be desirable to use less than the stoichiometric equivalent of the calcium carbonate employed.

As stated previously, a preferred form of our invention involves the use of a selected quantity of sodium hexametaphosphate in conjunction with sodium tripolyphosphate. The amount of sodium hexametaphosphate which may be employed can range up to about 50% by weight of the sodium tripolyphosphate which is used.

(4) In producing aqueous gels in accordance with our invention, in addition to the alginates as described in (1) above, the calcium carbonate described in (2) above, and the sodium tripolyphosphate with optional quantities of sodium hexametaphosphate described in (3) above, we employ adipic acid. Adipic acid is available commercially and on the solution of adipic acid the calcium carbonate is ionized to yield calcium ions, which free ions subsequently react with the soluable alginates to form insoluble calcium alginate. In general it will be appreciated that the adipic acid is used in a quantity sufficient to liberate the calcium to react with the soluble alginate to form the insoluble calcium alginate gel. In addition, it will be apparent that this quantity of adipic acid will give an acidic taste to the resulting gel which, however, is not unpleasantly tart due to the presence of the sodium tripolyphosphate.

In addition to the foregoing ingredients as above mentioned we prefer to also include a magnesium salt in our formulation for added clarity in the resulting gels. The magnesium salt employed should be preferably powdered magnesium carbonate. To be useful for our purpose the said salt may be any magnesium salt that is soluble in a slightly acidic aqueous solution. Such salts would include magnesium citrate, magnesium acetate, magnesium oxide, magnesium hydroxide, magnesium chloride, and the like. It will be appreciated that certain of these salts such as magnesium chloride would tend to make our gel-forming compositions hygroscopic and less stable on storage although otherwise operative for our purpose. The amount of magnesium salt required in accordance with our invention is substantially less than the amount of calcium salt required. In accordance with our invention we have found that incorporating about .05 gm. to about 0.15 gm. per pint of aqueous medium used in preparing the gel in accordance with our invention is satisfactory or in other words about .01% to .03% by weight of magnesium salt based on the aqueous medium employed. Surprisingly, although a magnesium salt will not form a water insoluble algin gel, its presence with calcium in accordance with our invention does not preclude the formation of a calcium gel but in lieu thereof gives added clarity to the calcium gels made in accordance with our invention.

In keeping with our invention it is our purpose to produce a combination of ingredients that can be added in one step to produce an aqueous gel. This combination may be used with either hot or cold water and a gel will result without refrigeration. We prefer to pre-mix all of the ingredients used in accordance wih our invention, i.e., the water soluble alginate, calcium carbonate, the magnesium salt, e.g., magnesium carbonate, sodium tripolyphosphate, sodium hexametaphosphate, and the adipic acid.

The following are examples of our invention. The ingredients as shown were mixed dry and then added to hot water. The dry ingredients were also tested for shelf life with good results.

EXAMPLE I

|  | Amount (gms.) | Percent |
| --- | --- | --- |
| Sugar | 78.361 | 92.182 |
| Sodium alginate, fibrous | 2 | 2.35 |
| Sodium tripolyphosphate | 1.3 | 1.53 |
| Calcium carbonate | 0.3 | 0.353 |
| Magnesium carbonate | 0.064 | 0.075 |
| Adipic acid | 2.75 | 3.24 |
| Wild cherry flavor powder | 0.20 | 0.24 |
| Red food coloring | 0.025 | 0.03 |
| Water (One pint) | | |
| | 85 | 100 |

The above dry composition will be found to weigh approximately three ounces and the bulk thereof makes said amount of ingredients suitable for a convenient size household package. The said ingredients will produce a gel with one pint of either hot or cold water (preferably hot) either with or without refrigeration.

The ingredients in Example I above produced a light-bodied gel of exceptional clarity when mixed with hot water.

EXAMPLE II

|  | Amount (gms.) | Percent |
| --- | --- | --- |
| Sugar | 77.625 | 91.31 |
| Sodium alginate, fibrous | 2.5 | 2.94 |
| Sodium tripolyphosphate | 1.5 | 1.77 |
| Calcium carbonate | 0.32 | 0.38 |
| Magnesium carbonate | 0.08 | 0.094 |
| Adipic acid | 2.75 | 3.24 |
| Wild cherry flavor powder | 0.2 | 0.24 |
| Red food coloring | 0.025 | 0.03 |
| Water (One pint) | | |
| | 88 | 100 |

The ingredients in Example II will produce a medium bodied gel of exceptional clarity when mixed with hot water.

EXAMPLE III

|  | Amount (gms.) | Percent |
| --- | --- | --- |
| Sugar | 77.025 | 90.604 |
| Sodium alginate, fibrous | 3.0 | 3.54 |
| Sodium tripolyphosphate | 1.5 | 1.77 |
| Calcium carbonate | 0.4 | 0.471 |
| Magnesium carbonate | 0.1 | 0.105 |
| Adipic acid | 2.75 | 3.24 |
| Wild cherry flavor powder | 0.2 | 0.24 |
| Red food coloring | 0.025 | 0.03 |
| Water (One pint) | | |
| | 85 | 100 |

The ingredients in Example III produced a clear heavy bodied gel when mixed with hot water. This type of gel is usually preferred by institutions such as hospitals and the like.

The gel of Example III was tested with a Bloom Gelometer. The Bloom Gelometer is an instrument that is available commercially from the Precision Scientific Company, 3737 W. Cortland St., Chicago, Ill., 60647. It was developed by Dr. Oscar Bloom of Swift & Co. and is used to determine the gel strength of food products such as gelatin desserts. The instrument is used by the Government and by institutions in testing not only gelatin desserts but other types of gel desserts as well. In general, the instrument is a device containing a plunger that is lowered a predetermined distance, usually 4 millimeters, into the sample. The force applied to the plunger to drive it against the resistance of the gel or jelly is a direct measure of the gel strength or jelly strength of the material tested. The result is reported in grams.

The gel of Example III was made up in hot distilled wated and poured into a Bloom bottle. After cooling to room temperature and setting, the gel strength at about 20° C. was determined by a Bloom Gelometer to be 25.5 grams. When this experiment was repeated using San Diego tap water in lieu of distilled water, the Bloom Gelometer strength was found to be 32.7 grams. San Diego tap water has a hardness of about 350 to about 360 parts per million.

The gel set forth in Example III was prepared using 1.5 grams of sodium hexametaphosphate in lieu of the 1.5 grams of sodium tripolyphosphate. Distilled water was employed in forming the gel and the gel strength at about 20° C. as determined by a Bloom Gelometer was found to be 19.3 grams. When this experiment was repeated using San Diego tap water in lieu of distilled water, the gel strength was found to be 28.5 grams.

In a still further test, the gel described in Example III was formed in distilled water using 0.5 gram of calcium carbonate instead of 0.4 gram, and a combination of 1.5 grams of sodium tripolyphosphate and 0.7 gram of sodium hexametaphosphate in place of the 1.5 grams of sodium tripolyphosphate. The gel which was formed on cooling to about room temperature or 20° C. had a gel strength of 26.6 grams as determined by a Bloom Gelometer. When the experiment was repeated using a very hard water having a total hardness of about 500 parts per million in lieu of the distilled water, the gel which formed had a gel strength at about 20° C. of 40.0 grams as determined by a Bloom Gelometer.

As illustrated by the above data, the use of sodium tripolyphosphate according to our invention gives a gel having a higher gel strength than that obtained when sodium hexametaphosphate is used as the sequestering agent. The use of sodium tripolyphosphate in combination with sodium hexametaphosphate according to our invention provided a gel which formed even in the hardest water, e.g., one having a total hardness of 500 parts per million.

Concerning the range of ingredients employed in accordance with our invention we may use from 1.5 to 5.0 parts by weight of a water soluble salt of alginic acid, from about 0.2 to 0.6 parts by weight of calcium carbonate, about 0.5 to 3.0 parts by weight of sodium tripolyphosphate and from about 0.25 to 4.0 parts by weight of adipic acid. In addition, sodium hexametaphosphate may be employed in an amount up to about 50% by weight of the sodium tripolyphosphate. When a magnesium salt such as $MgCO_3$ is included in the formulation in accordance with the preferred embodiment of our invention it should be present in an amount of .05 to 0.15 parts by weight. In forming a gel, the above ingredients, with the parts by weight being expressed in grams, are admixed with about one pint of either hot or cold aqueous medium.

We claim:
1. A product suitable for producing an improved aqueous gel comprising a water soluble alginate in sufficient quantity to form an alginate gel, calcium carbonate in a sufficient amount to form a gel with said alginate, sodium tripolyphosphate in an amount less than the stoichiometric equivalent of said calcium carbonate, adipic acid in an amount sufficient to liberate calcium ions from said calcium carbonate and to thereby form a water insoluble calcium alginate gel, and a magnesium salt which is soluble in a slightly acidic aqueous solution, said magnesium salt being present in an amount sufficient to provide a gel having improved clarity.

2. A product suitable for producing an improved aqueous gel comprising from 1.5 to 5.0 parts of a water soluble alginate, from about 0.2 to about 0.6 parts of calcium carbonate, from about 0.5 to about 3.0 parts of sodium tripolyphosphate, from about 0.25 to 4.0 parts of adipic acid and from about 0.05 to 0.15 parts of a magnesium salt which is soluble in a slightly acidic aqueous solution.

3. The composition of claim 2 wherein said magnesium salt is magnesium carbonate.

4. The composition of claim 2 containing in addition sodium hexametaphosphate in an amount ranging up to about 50% by weight of said sodium tripolyphosphate.

5. The composition of claim 2 wherein said water soluble alginate is sodium alginate.

6. The composition of claim 4 wherein said water soluble alginate is sodium alginate.

7. A method of producing an improved aqueous gel comprising gelatinizing an aqueous liquid by adding thereto a mixture comprising a water soluble alginate, calcium carbonate, sodium tripolyphosphate, adipic acid in an amount sufficient to liberate calcium ions from the said calcium carbonate and thereby form a water isoluble calcium alginate gel, and a magnesium salt which is soluble in a slightly acidic aqueous solution, said magnesium salt being present in an amount sufficient to provide a gel having improved clarity.

8. A method of producing an improved aqueous gel comprising gelatinizing an aqueous liquid by adding thereto a mixture containing from 1.5 to 5.0 parts of a water soluble alginate, from about 0.2 to about 0.6 parts of calcium carbonate, from about 0.5 to about 3.0 parts of sodium tripolyphosphate, from about 0.25 to 4.0 parts of adipic acid, and from about 0.05 to about 0.15 parts of a magnesium salt which is soluble in a slightly acidic aqueous solution.

9. The method of claim 8 wherein said magnesium salt is magnesium carbonate.

10. The method of claim 8 wherein said mixture contains in addition sodium hexametaphosphate ranging up to about 50% by weight of said sodium tripolyphosphate.

References Cited
UNITED STATES PATENTS

| | | | |
|---|---|---|---|
| 2,918,375 | 12/1959 | Gibsen | 99—131 |
| 2,987,400 | 6/1961 | Hunter | 99—131 X |
| 2,992,925 | 7/1961 | Green | 99—131 |
| 3,060,032 | 10/1962 | Glicksman | 99—131 |

RAYMOND N. JONES, Primary Examiner

J. M. HUNTER, Assistant Examiner